United States Patent

Uyama et al.

[15] 3,648,792

[45] Mar. 14, 1972

[54] WEIGHING DEVICE

[72] Inventors: Noboru Uyama; Yoshiaki Shimada, both of Osaka; Masamichi Hino, Suita; Rinosuke Yoneda, Koriyama, all of Japan

[73] Assignee: Kubota Tekko Kabushiki Kaisha, also known as Kubota, Ltd., Osaka, Japan

[22] Filed: Feb. 27, 1970

[21] Appl. No.: 15,115

[30] Foreign Application Priority Data

| May 17, 1969 | Japan | 44/38164 |
| May 17, 1969 | Japan | 44/45480 |
| May 17, 1969 | Japan | 44/45481 |
| May 17, 1969 | Japan | 44/45482 |

[52] U.S. Cl. .......................... 177/210, 177/216, 177/DIG. 5
[51] Int. Cl. ............................................................. G01g 3/14
[58] Field of Search ................. 177/210, 216, DIG. 5, DIG. 6

[56] References Cited

UNITED STATES PATENTS

| 2,081,367 | 5/1937 | Nicolson | 177/210 |
| 2,963,907 | 12/1960 | Sylvest | 177/DIG. 5 |
| 3,047,855 | 7/1962 | Wolinsky | 177/DIG. 6 |
| 3,186,505 | 6/1965 | Vinzelberg et al. | 177/210 |
| 3,268,020 | 8/1966 | Puechberty | 177/210 |
| 3,494,433 | 2/1970 | Masuo et al. | 177/216 X |

FOREIGN PATENTS OR APPLICATIONS

| 19,486 | 8/1956 | Germany | 177/210 |

*Primary Examiner*—Richard B. Wilkinson
*Assistant Examiner*—George H. Miller, Jr.
*Attorney*—Wenderoth, Lind & Ponack

[57] ABSTRACT

A weighing device for magnetically detecting the weight of an object. The device has a lever which turns to the angle where the turning force due to the weight of the object and the opposite turning force due to the weight of the balance device is balanced. A magnetic lattice is provided on one part of the cylindrical surface having its center at the fulcrum of said lever, and a magnetic signal graduation is provided by said magnetic lattice as said lever moves. A detector detects said graduation and the direction of movement of the graduation. A counting device is provided which carries out addition and subtraction by adding the positive pulses and subtracting the negative pulses depending on whether positive or negative direction of movement is detected by said detector.

4 Claims, 6 Drawing Figures

WEIGHING DEVICE

This invention relates to weighing device for magnetically detecting the weight of an object to be weighed, transmitting it as a pulse signal and determining the weight by counting the number of pulses.

Among the conventional weighing devices, various kinds of weighing devices which transmit the weight of the object to be weighed as a pulse signal have been contrived. In the conventional weighing device, however, the pulse signal generator has many mechanically movable parts which makes the mechanism complex and has such a defect that never can the pulse signal of fine pitch be transmitted.

The first object of this invention lies in obtaining the accurate value of weight with a simple or compact mechanism by means of a magnetic lattice to detect movement of the weighing device. Another object of this invention lies in enabling the weighing mechanism to perform exact weighing of the fixed quantity by emitting "a signal before fixed quantity" which switches the supplying device to a small quantity of supply when the weight signal emitted from the weighing mechanism reaches just before the fixed weight of set value.

A further object of this invention lies in enabling the weighing mechanism to perform correct weight typewriting by means of emitting a balance signal actuating devices such as a correct weight typewriter when the weighing mechanism balances and the pulse signal stops more than a certain time interval.

These and other objects are accomplished by the parts, improvements, combinations and arrangements comprising the invention, a preferred embodiment of which is shown by way of example in the accompanying drawings, and herein described in detail. Various modifications and changes in details of construction are comprehended within the scope of the appended claims.

Figure 1:
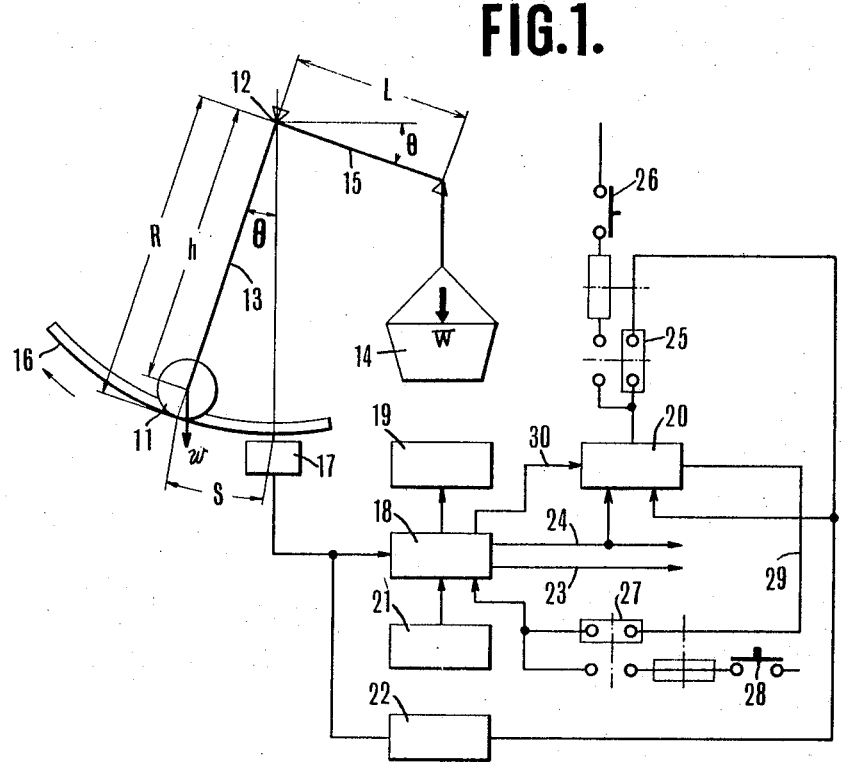
FIG. 1 is a view which illustrates one embodiment of this invention "weighing apparatus" including the circuit diagram, with no object to be weighed on the apparatus.

Referring to FIG. 1, a weight 11 is fixed at an end of a lever 13 swinging around the fulcrum 12 and a hopper 14 for containing the object or material to be weighed hangs at an end of a lever 15 centering at the fulcrum 12, securing 13 and 15 together in a body. If W is the weight (kg.) of the object contained in the hopper, $w$ is the weight (kg.) of 11, $h$ is the distance (cm.) between the fulcrum 12 and the center of the weight 11, L is the distance (cm.) between the W loading point of the lever 15 and the fulcrum 12, and ($\theta$) is the angle (radian) of inclination of the lever 13 or 15, the following equation can readily be obtained:

$$L \cdot W \cos \theta = w \cdot h \sin \theta \quad (1)$$

By the way, a magnetic lattice 16 secured to the lever 15 forms a part of a cylinder centering on the fulcrum 12 and having a radius R. 17 is such a detector as is called "magnetic flux response type multigap head" fixed in the rest position of a frame of the weighing mechanism and such so as to be positioned extremely adjacent to the outer periphery of said lattice 16.

Figure 5:
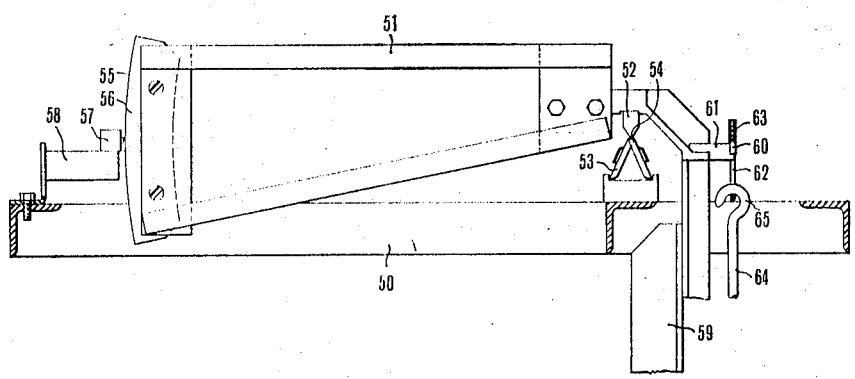
FIG. 5 is a front view showing an embodiment of the lever with no object to be weighed on the apparatus.
Figure 6:
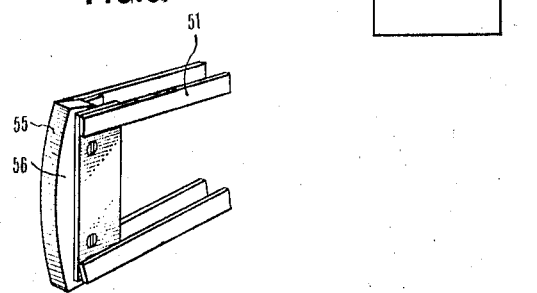
FIG. 6 is a perspective view showing the fitting part of the magnetic lattice at the end of the foregoing lever.

FIGS. 5 and 6 show an embodiment of a magnetic lattice and a lever to which the said lattice has been fixed. In the drawing the numeral 50 designates a frame, 51 designating a frame-shaped lever, the fulcrum edge 52 thereof being sustained by an edge receiver 53 on the frame 50 so that the lever 51 will swing with the contact point between the fulcrum edge 52 and the edge receiver 53 as a fulcrum 54.

Furthermore, to the left-hand end of the said lever 51 is fixed a magnetic recording medium 56 forming a part of a cylinder of radius R centering on the fulcrum 54, and on the cylindrical surface of this medium is recorded a magnetic lattice 55, a detector 57 very adjacent the said magnetic lattice 55 being fitted to a receiving member 58 which is fixed on to the frame 50.

The right-hand terminal of the lever 51 protrudes to the right beyond the fulcrum 54, a lever 59 extending downward from the said terminal, a weight 66 being fitted to the lower end of said lever 59.

Moreover, at the external end of the right-hand terminal of the said lever 51 is provided a protrusion 61 equipped with a weight point edge 60 facing upward, the said weight point edge 60 engaging with an edge receiver 63 at the lower side of the upper part of a hanging frame 62, a hook 65 at the upper end of a connecting rod 64 engaging with the said hanging frame 62.

To the lower end of the foregoing connecting rod 64 is connected a hopper, loading platform or the like to receive the load of the object to be weighed through a fulcrum system which is not shown in the drawing, it being so designed that the connecting rod 64 will be pulled down by a force in proportion to the weight of the object to be weighed, the lever 51 consequently being rotated to the right in FIG. 5 centering on the fulcrum 54 by the load of the object to be weighed which pulls down the connecting rod 64, the weight 66 at the lower end of the lever 59 swinging to the left beyond the perpendicular line which passes through the fulcrum 54, thereby generating a force which so acts as will rotate the lever 51 to the left, with the result that the lever 51 comes to a standstill at an angle wherein the downward force acting on the connecting rod 64 is balanced with the said force giving left-hand rotation to the lever 51. The said angle is detected by the detector 57 which detects the magnetic lattice 55.

Thus employing the distance S (cm.) displaced along the arc of zero point of the magnetic lattice 16 when the lever 13 rotates by an angle ($\theta$) as shown in FIG. 1, and the distance (cm.) between the fulcrum 12 and the outer periphery of the magnetic lattice 16, we have $$S = R\theta \quad (2)$$

and $$W = wh/L \tan \theta \quad (3)$$

$$\tan \theta = L/wh \cdot W \quad (4)$$

$$\theta = \tan^{-1}\left(\frac{L}{wh} \cdot W\right) \quad (5)$$

From the equation (3), it is clear that the load W of the object to be weighed is proportional to tangent or slope of the inclined angle of the lever 15, where $w$, $h$ and $L$ are known constants.

It is readily seen that the weight can be obtained by estimation of the tangent, while the inclined angle $\theta$ of the lever 15 or 13 can be expressed as a function of $\tan^{-1}$ of the load to be measured as the equation (5) shows.

Furthermore, from the equation (2), $$\theta = S/R \quad (6)$$

From the equations (5) and (6), $$\frac{S}{R} = \tan^{-1}\left(\frac{L}{wh} \cdot W\right) \therefore S = R \cdot \tan^{-1}\left(\frac{L}{wh} \cdot W\right) \quad (7)$$

Thence, on the magnetic medium arranged in the magnetic lattice 16, a scale or reading of interval of $$S = R \cdot \tan^{-1}\left(\frac{L}{wh} \cdot W\right)$$

is arranged, reading it by the detector 17, number of pulses emitted from the detector 17 can be counted by a counter circuit of addition and subtraction.

Figure 2:
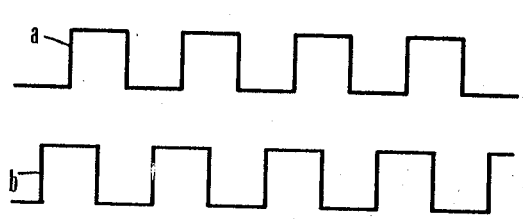
FIG. 2 is a drawing of square wave which illustrate an example of the pulse signal emitted from a detector or sensor.

Let the electric circuit design so that two series of pulses $a$ and $b$ dephased each other by 90° appear from the detector 17 by the magnetic signal graduation as shown in FIG. 2, the pulses $a$ and $b$ advancing in the direction of the arrow of FIG. 2 when the lattice 16 moves in the direction of an arrow in FIG. 1 and the pulses $a$ and $b$ advancing in the opposite direction when the lattice 16 moves in the anti-arrow direction.

Then, in the case of arrow direction movement, pulse $a$ is detected earlier by 90° than pulse $b$, and in the case of anti-arrow direction movement, pulse $b$ gains by 90° more than pulse $a$, so that the direction of the lattice 16 movement can be detected.

In other words, the pulses $a$ and $b$ as shown in FIG. 2 which are emitted from the detector 17 are sent or transmitted to the counter circuit 18 of addition and subtraction as shown in FIG. 1 and said circuit 18 discriminates which pulse $a$ or $b$ was emitted earlier. When the movements of pulses $a$ and $b$ are in the arrow direction, additive counting is carried out, as the magnetic lattice is moving in the arrow direction in FIG. 1, while subtractive counting is performed if the pulses $a$ and $b$ are moving in the anti-arrow direction, and thus estimating the correct value of the weight.

A digital indicator 19 is connected with the above-mentioned counter circuit 18 of addition and subtraction, indicating the value of weight counted by the circuit 18.

In the embodiment of this invention as shown in the accompanying drawings, furthermore, a quantitative set device 21, a weight-value transmitter circuit 30, a balance circuit 22, a prequantitative (or before-destination) signal transmitter circuit 23 and quantitative (or destination) signal transmitter circuit 24 are connected with the counting circuit 18 so as to enable it to weigh quantitatively, and a typewriting device 20 is connected with the weight signal transmitter circuit 30 so as to enable it to typewrite the value of weight.

Said device 20 is equipped with an automatic-manual change-over switch 25, being provided with a push-button switch 26 in the manual side of the switch 25 and connected with said balance circuit 22 in its automatic side, and between the counter circuit 18 and the typewriting circuit 20, a net accumulating change-over circuit 27 is connected with a reset circuit 29 provided with a pushbutton switch 28 for reset.

In the construction of the circuit as above-mentioned, the weight to be weighed is preset by the quantitative set device 21. When the object to be weighed in the desired or requested shape of grain, powder or such is started to be thrown from a proper throwing or casting device into the hopper 14, the levers 13 and 15 begin to incline and the pulses are emitted from the detector 17, being counted by the counter circuit 18.

When the numerical value counted by said circuit 18 reaches the value less than the set one by the predetermined constant, a prequantitative or "before-destination" signal is emitted from the circuit 23 and transmitted or sent to the throwing device, switching it to "a small quantity of supply", so that the throwing speed of the object to be weighed into the hopper 14 slows or decreases and inclining speed of the levers 13 and 15 slows, too. When the thrown quantity reaches the set value, a quantitative or "destination" signal is emitted and transmitted to the throwing device to stop throwing into the hopper 14.

When the throwing and then the levers 13, 15 stop, the pulse signal from the detector 17 stops, so that the balance circuit 22 acts to transmit a typewriting receptable signal to the typewriting device 20, enabling it to typewrite. If the automatic-manual change-over switch is situated in the manual side, by pushing the typewriting push-button, the typewriting device 20 acts to perform typewriting of the weight on a card or tape.

Even if the push-button switch 26 is pushed before stop of the levers 13, 15, the typewriting device 20 does not work before the levers 13, 15 stop and the typewriting receptable signal is transmitted to the circuit 20, accordingly there is no possibility of mistype. If the automatic-manual change-over switch is in the automatic side, a signal is transmitted from the balance circuit 22 to the device 20, typing being performed automatically.

When a completion signal of typewriting is emitted after the typewriting device 20 acts as before-mentioned, the signal is transmitted to the counter circuit 18 to reset the circuit 18 if the change-over switch 27 is situated in the net or gross side, while if the switch 27 is situated in the accumulative side, the completion signal of typewriting does not reach the circuit 18 even if it is emitted from the device 20. In the latter case, the reset signal does not transmit to the circuit 18 for resetting till the push-button 28 is pushed.

In said net-accumulative change-over switch, it is convenient that some brands or species of materials are successively cast or thrown into the hopper 14 to weigh accumulatively, and when successive typewriting of net or gross weight of each brand is desired, the knife of the change-over switch 27 is thrown in the net side so that the circuit 18 may automatically reset brand after brand, while the change-over switch 27 is thrown in the accumulative side so as not to reset when accumulative weighing of all the brands is desired.

Figure 3:
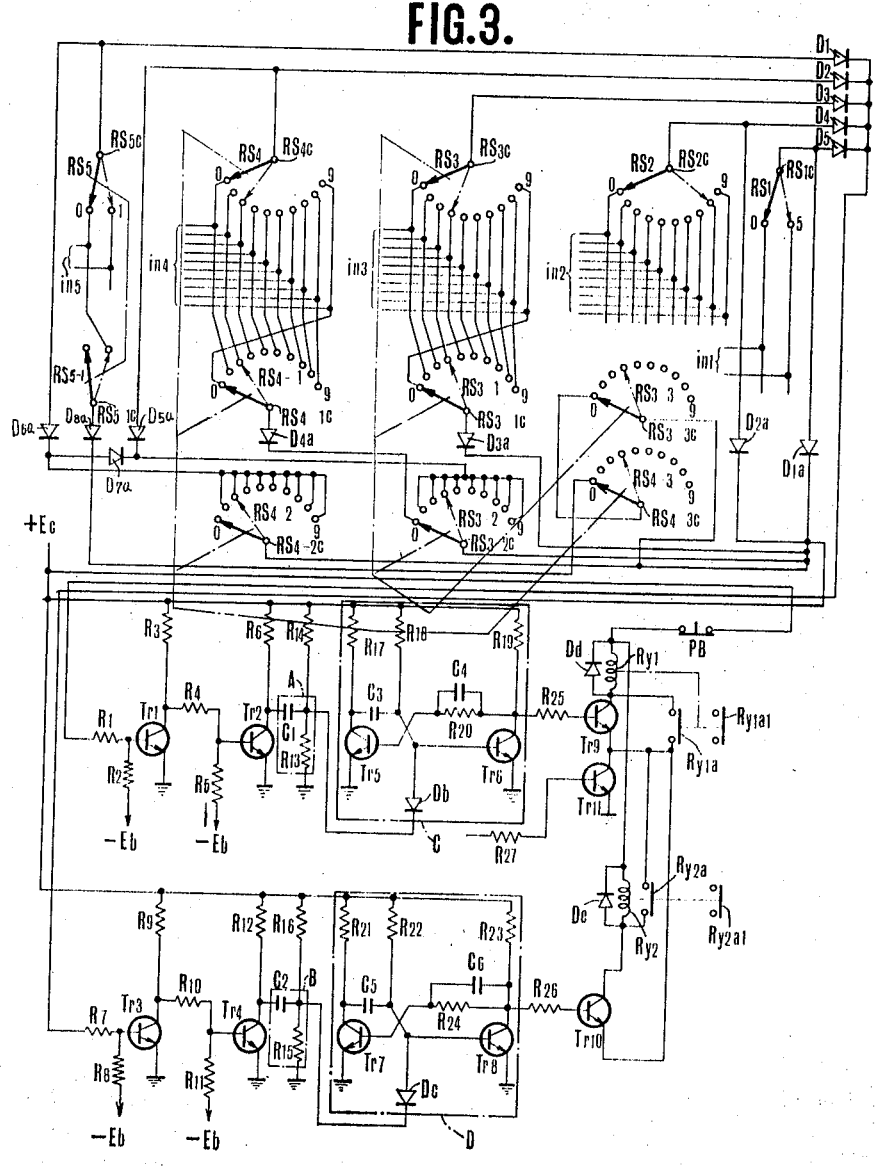
FIG. 3 is a circuit diagram of quantitative and prequantitative pulse-generator devices.

FIG. 3 is a circuit diagram which illustrates one embodiment of the device for emitting before-destination signal or signal telling some time before arrival at the set quantity and destination signal or signal telling the arrival at the set quantity and device for setting the fixed or constant quantity.

As an example of working plans for explaining FIG. 3, the maximum set value of 19,995 kg., the minimum set graduation of 5 kg. and the constant value of 100 kg. before the set value are designed, however, it is clear that other numerical values of the maximum set value, the minimum set scale and the constant value before the set may be selected to construct the circuit by the same idea.

Referring to FIG. 3, selection switches $RS_1$, $RS_2$, $RS_3$, $RS_4$, $RS_5$ are arranged as a set device of the required number of quantities corresponding to the number of figures or places, the switches $RS_1$, $RS_5$ corresponding to the lowest and the highest places respectively being two-channel changeover, and the switches $RS_2$, $RS_3$, $RS_4$ corresponding to the middle places being ten-channel changeover from 0 to 9. Said switches $RS_3$ and $RS_4$ are linked with $RS_{3-1}$, $RS_{3-2}$, $RS_{3-3}$ and $RS_{4-1}$, $RS_{4-2}$, $TS_{4-3}$ of the same ten-channel construction respectively so as to move simultaneously and said switch $RS_5$ is connected with a switch $RS_{5-1}$ of two-channel construction. These switches $RS_3$ and $RS_4$ are connected with $RS_{3-1}$ and $RS_{4-1}$ respectively by one channel shift in any of 10 channels so that the direction of the connection may be 0 → 1, 1 → 2, 2 → 3, 3 → 4, 4 → 5, 5 → 6, 6 → 7, 7 → 8, 8 → 9, 9 → 0 when $RS_3 \to RS_{3-1}$ and $RS_4 \to RS_{4-1}$. Switches $RS_1$, $RS_2$, $RS_3$, $RS_4$, $RS_5$ are provided with inputs of weighing signals $in_1$, $in_2$, $in_3$, $in_4$, $in_5$ corresponding to their places respectively, and altogether the common contacts $RS_{1c}$, $RS_{2c}$, $RS_{3c}$, $RS_{4c}$, $RS_{5c}$ of said switches $RS_1$, $RS_2$, $RS_3$, $RS_4$, $RS_5$ constitute an AND circuit through diodes $D_1$, $D_2$, $D_3$, $D_4$, $D_5$. Said common contacts $RS_{4c}$ and $RS_{5c}$ are parallelly connected with nine channels from 1 to 9 of $RS_{3-2}$ and $RS_{4-2}$ through diodes $D_{5a}$ and $D_{6a}$ respectively. The common contact $RS_{4-1c}$ of the switch $RS_{4-1}$ and the common contact $RS_{5-1c}$ of the switch $RS_{5-1}$ are connected with 0 contacts of the switches $RS_{3-2}$ and $RS_{4-3}$ through diodes $D_{4a}$ and $D_{8a}$ respectively, and the common contact $RS_{4-3c}$ of said switch $RS_{4-3}$ is connected with 0 contact of the switch $RS_{3-3}$. The common contact $RS_{1c}$ of the switch $RS_1$, the common contact $RS_{2c}$ of the switch $RS_2$ and the common contact $RS_{3-1c}$ of the switch $RS_{3-1}$ are connected with a resistor $R_7$ through diodes $D_{1a}$, $D_{2a}$ and $D_{3a}$ respectively, while the common contacts $RS_{3-2c}$, $RS_{4-2c}$ and $RS_{3-3c}$ of the switches $RS_{3-2}$, $RS_{4-2}$ and $RS_{3-3}$ respectively are connected with the resistor $R_7$ directly and thus altogether constituting an AND circuit. The diode $D_{6a}$ is connected with 1 to 9 contacts of the switch $RS_{3-2}$ through a diode $D_{7a}$. In the gate or output side of AND circuit composed of the diodes $D_1$, $D_2$, $D_3$, $D_4$, $D_5$, a circuit composed of transistors $Tr_1$, $Tr_2$ and resistors $R_1$, $R_2$, $R_3$, $R_4$, $R_5$, $R_6$ is constructed, while in the gate or output side of AND circuit composed of $D_{1a}$, $D_{2a}$, $D_{3a}$, $D_{4a}$, $D_{5a}$, $D_{6a}$, $D_{7a}$, a NOT circuit composed of transistors $Tr_3$, $Tr_4$ and resistors $R_7$, $R_8$, $R_9$, $R_{10}$, $R_{11}$, $R_{12}$ is constructed, and these circuits are connected with differential circuits A, B which are constructed by coupling of condenser or capacitor $C_1$ with resistors $R_{13}$, $R_{14}$ and capacitors $C_2$ with resistors $R_{15}$, $R_{16}$ respectively. Monostable multivibrator C is composed of transistors $Tr_5$, $Tr_6$, capacitors $C_3$, $C_4$, resistors $R_{17}$, $R_{18}$, $R_{19}$, $R_{20}$ and diode $D_b$, while monostable multivibrator D is composed of transistors $Tr_7$, $Tr_8$, condenser $C_5$, $C_6$, resistors $R_{21}$, $R_{22}$, $R_{23}$, $R_{24}$ and diode $D_c$. Outputs of these multivibrators C and D are connected with relay coils $Ry_1$ and $Ry_2$ through switching transistors $Tr_9$ and $Tr_{10}$ respectively. Self-holding circuits are constructed by preliminary contact $Ry_{1a}$ and $Ry_{2a}$ of said relay coils $Ry_1$ and $Ry_2$ respectively. In the figure, a switching transistor $Tr_{11}$ for reset signal is in the conductible state, as positive potential is always applied on the base side of said transistor $Tr_{11}$. $R_{25}$, $R_{26}$, $R_{27}$ are resistors for (outward) connection, $D_d$, $D_e$ are diodes for protection, PB is a pushbutton for manual reset, and $Ry_{1a1}$, $Ry_{2a1}$ are supply speed switching contacts in the supplying device side of the object to be weighed.

As an example of the action, if the selection switches $RS_1$, $RS_2$, $RS_3$, $RS_4$, $RS_5$ as shown in FIG. 3 is set at 12,385 kg. in such a state as shown by broken lines and this set value is the desired constant, weighing signals are successively led in the inputs $in_1$, $in_2$, $in_3$, $in_4$, $in_5$ connected with the weighing device side from the counter circuit 18. (As before-mentioned, the emitting value of the before-destination or prequantifying signal is determined by the circuit construction so as to be emitted just 100 kg. before.) When the weight reaches the value 12,285 kg. less than the set value by 100 kg., from the input $in_5$ the pulse of 10,000 kg. runs through $RS_{5c} \rightarrow D_{6a} \rightarrow$ the switch $RS_{4-2}$ coupled with the switch $RS_4$ and being in the state of contact 2 and finally reaches $RS_{4-2c}$. In the same manner, the pulse signal of 2,000 kg. runs from $in_4$, through contact 2 of the switch $RS_4 \rightarrow RS_{4c} \rightarrow D_{5a}$ and reaches $RS_{3-2c}$, the signal of 200 kg. from $in_3$ runs according as contact 3 of the switch $RS_{3-1} \rightarrow RS_{3-1c} \rightarrow D_{3a}$, the signal of 80 kg. from $in_2$ runs according as contact 8 of the switch $RS_2 \rightarrow RS_{2c} \rightarrow D_{2a}$, and the signal of 5 kg. from $in_1$ runs according as $RS_1 \rightarrow RS_{1c} \rightarrow D_{1a}$, thus altogether satisfying the condition of AND circuit, from the output side of said AND circuit a certain negative potential is applied on the base side of transistor $Tr_3$ in the NOT circuit. Then said transistor $Tr_3$ is in the nonconductive state, while $Tr_4$ becomes conductive, accordingly the monostable multivibrator D works by a negative trigger emitted from the differential circuit B, then the transistor $Tr_{10}$ is caused to have conductivity to magnetize the relay coil $Ry_2$, which is self-held through its contact $Ry_{2a}$. Then said relay coil $Ry_2$ causes automatic switching toward small quantity supply states in the supplying device through the contact $Ry_{2at}$ which simultaneously work together with the contact $Ry_{2a}$. Subsequently, when the small quantity of supply accumulates to reach the set value, the signal of 10,000 kg. from the signal input $in_5$ runs through contact 1 of the switch $RS_5 \rightarrow$ the common contact $RS_{5c}$ and reaches $D_1$, while the signals of 2,000 kg., 300 kg., 80 kg., and 5 kg. from $in_4$, $in_3$, $in_2$, and $in_1$ runs according as contact 2 of $RS_4$, contact 3 of $RS_3$, contact 8 of $RS_2$ and contact 5 of $RS_1 \rightarrow RS_{4c}$, $RS_{3c}$, $RS_{2c}$ and $RS_{1c} \rightarrow D_2$, $D_3$, $D_4$ and $D_5$ respectively, and thus altogether satisfy the condition of AND circuit. Therefore, by the same action as before-mentioned, the transistor $Tr_9$ is turned into the state ON and the relay coil $Ry_1$ is magnetized, then its self-hold is accomplished by the contact $Ry_{1a}$; at the same time, supply of the object to be weighed in the side of supplying device is stopped by action of the contact $Ry_{1a1}$. Reset of prequantifying or before-destination signal and quantifying or destination signal can be accomplished by admitting negative signal in the side of transistor $Tr_{11}$.

Even if it is necessary to take down one place or more, for instance, when the weighed value before or less than the quantifying value of 12,085 kg. by 100 kg. is 11,985 kg., all the conditions are satisfied without any trouble in the state mentioned below, as contact 9 of the switch $RS_4$ is connected with contact 0 of $RS_{4-1}$ by one channel contact shift.

When the figure of 100 kg. place is zero, for instance, when
Value of the quantifying signal: 12,085 kg.
Value of the prequantifying signal: 11,985 kg.
(Course of the prequantifying signal)
10,000 kg. $\rightarrow$ $in_5$ $\rightarrow$ contact 1 of $RS_5$ $\rightarrow$ $RS_{5c}$ $\rightarrow$ $D_{6a}$
$\rightarrow$ contact 2 of $RS_{4-2}$ $\rightarrow$ $RS_{4-2c}$,
1,000 kg. $\rightarrow$ $in_4$ $\rightarrow$ contact 2 of $RS_{4-1}$ $\rightarrow$ $RS_{4-1c}$ $\rightarrow$ $D_{4a}$
$\rightarrow$ contact 0 of $RS_{3-2}$ $\rightarrow$ $RS_{3-2c}$,
900 kg. $\rightarrow$ $in_3$ $\rightarrow$ contact 0 of $RS_{3-1}$ $\rightarrow$ $RS_{3-1c}$ $\rightarrow$ $D_{3a}$,
80 kg. $\rightarrow$ $in_2$ $\rightarrow$ contact 8 of $RS_2$ $\rightarrow$ $RS_{2c}$ $\rightarrow$ $D_{2a}$,
5 kg. $\rightarrow$ $in_1$ $\rightarrow$ contact 5 of $RS_1$ $\rightarrow$ $RS_{1c}$ $\rightarrow$ $D_{1a}$.
(Course of the quantifying signal)
10,000 kg. $\rightarrow$ $in_5$ $\rightarrow$ contact 1 of $RS_5$ $\rightarrow$ $RS_{5c}$ $\rightarrow$ $D_1$,
2,000 kg. $\rightarrow$ $in_4$ $\rightarrow$ contact 2 of $RS_4$ $\rightarrow$ $RS_{4c}$ $\rightarrow$ $D_2$,
000 kg. $\rightarrow$ $in_3$ $\rightarrow$ contact 0 of $RS_3$ $\rightarrow$ $RS_{3c}$ $\rightarrow$ $D_3$,
80 kg. $\rightarrow$ $in_2$ $\rightarrow$ contact 8 of $RS_2$ $\rightarrow$ $RS_{2c}$ $\rightarrow$ $D_4$,
5 kg. $\rightarrow$ $in_1$ $\rightarrow$ contact 5 of $RS_1$ $\rightarrow$ $RS_{1c}$ $\rightarrow$ $D_5$.
When the figures of 1,000 kg. and 100 kg. places are zero, for instance, when
Value of the quantifying signal: 10,085 kg.
Value of the prequantifying signal: 09,985 kg.
(Course of the prequantifying signal)
00,000 kg. $\rightarrow$ $in_5$ $\rightarrow$ contact 1 of $RS_{5-1}$ $\rightarrow$ $RS_{5-1c}$ $\rightarrow$ $D_{6a}$
$\rightarrow$ contact 0 of $RS_{4-3}$ $\rightarrow$ $RS_{4-3c}$ $\rightarrow$ contact 0 of $RS_{3-3}$
$\rightarrow$ $RS_{3-3c}$,
9,000 kg. $\rightarrow$ $in_4$ $\rightarrow$ contact 0 of $RS_{4-1}$ $\rightarrow$ $RS_{4-1c}$ $\rightarrow$ $D_{4a}$
$\rightarrow$ contact of 0 of $RS_{3-2}$ $\rightarrow$ $RS_{3-2c}$,
900 kg. $\rightarrow$ $in_3$ $\rightarrow$ contact 0 os $RS_{3-1}$ $\rightarrow$ $RS_{3-1c}$ $\rightarrow$ $D_{3a}$,
80 kg. $\rightarrow$ $in_2$ $\rightarrow$ contact 8 of $RS_2$ $\rightarrow$ $RS_{2c}$ $\rightarrow$ $D_{2a}$,
5 kg. $\rightarrow$ $in_1$ $\rightarrow$ contact 5 of $RS_1$ $\rightarrow$ $RS_{1c}$ $\rightarrow$ $D_{1a}$.
(Course of the quantifying signal)
10,000 kg. $\rightarrow$ $in_5$ $\rightarrow$ contact 1 of $RS_5$ $\rightarrow$ $RS_{5c}$ $\rightarrow$ $D_1$,
0,000 kg. $\rightarrow$ $in_4$ $\rightarrow$ contact 0 of $RS_4$ $\rightarrow$ $RS_{4c}$ $\rightarrow$ $D_2$,
000 kg. $\rightarrow$ $in_3$ $\rightarrow$ contact 0 of $RS_3$ $\rightarrow$ $RS_{3c}$ $\rightarrow$ $D_3$,
80 kg. $\rightarrow$ $in_2$ $\rightarrow$ contact 8 of $RS_2$ $\rightarrow$ $RS_{2c}$ $\rightarrow$ $D_4$,
5 kg. $\rightarrow$ $in_1$ $\rightarrow$ contact 5 of $RS_1$ $\rightarrow$ $RS_{1c}$ $\rightarrow$ $D_5$.
When the figures of 10,000 kg. and 1,000 kg. are zero, for instance, when
Value of the quantifying signal: 00,385 kg.
Value of the prequantifying signal: 00,285 kg.
(Course of the prequantifying signal)
00,000 kg. $\rightarrow$ $in_5$ $\rightarrow$ contact 0 of $RS_5$ $\rightarrow$ $RS_{5c}$ $\rightarrow$ $D_{6a}$
$\rightarrow$ $D_{7a}$ $\rightarrow$ contact 3 of $RS_{3-2}$ $\rightarrow$ $RS_{3-2c}$,
0,000 kg. $\rightarrow$ $in_4$ $\rightarrow$ contact 0 of $RS_4$ $\rightarrow$ $D_{5a}$ $\rightarrow$ contact 3 of $RS_{3-2}$ $\rightarrow$ $RS_{3-2c}$,
200 kg. $\rightarrow$ $in_3$ $\rightarrow$ contact 3 of $RS_{3-1}$ $\rightarrow$ $RS_{3-1c}$ $\rightarrow$ $D_{3a}$,
80 kg. $\rightarrow$ $in_2$ $\rightarrow$ contact 8 of $RS_2$ $\rightarrow$ $RS_{2c}$ $\rightarrow$ $D_{2a}$,
5 kg. $\rightarrow$ $in_1$ $\rightarrow$ contact 5 of $RS_1$ $\rightarrow$ $RS_{1c}$ $\rightarrow$ $D_{1a}$.
(Course of the quantifying signal)
00,000 kg. $\rightarrow$ $in_5$ $\rightarrow$ contact 0 of $RS_5$ $\rightarrow$ $RS_{5c}$ $\rightarrow$ $D_1$,
0,000 kg. $\rightarrow$ $in_4$ $\rightarrow$ contact 0 of $RS_4$ $\rightarrow$ $RS_{4c}$ $\rightarrow$ $D_2$,
300 kg. $\rightarrow$ $in_3$ $\rightarrow$ contact 3 of $RS_3$ $\rightarrow$ $RS_{3c}$ $\rightarrow$ $D_3$,
80 kg. $\rightarrow$ $in_2$ $\rightarrow$ contact 8 of $RS_2$ $\rightarrow$ $RS_{2c}$ $\rightarrow$ $D_4$,
5 kg. $\rightarrow$ $in_1$ $\rightarrow$ contact 5 of $RS_1$ $\rightarrow$ $RS_{1c}$ $\rightarrow$ $D_5$.

According to the above-mentioned procedure, the prequantifying signal can securely be emitted at the instant just 100 kg. before the quantifying value where the conditions of AND circuit are satisfied. Although the construction of circuit in the above-mentioned embodiment of this invention enables the prequantifying signal be generated at the instant just before 100 kg. before the quantifying value, it is not always limited to 100 kg. before but can be selected according to the construction of the circuit whatever it may be.

Figure 4:
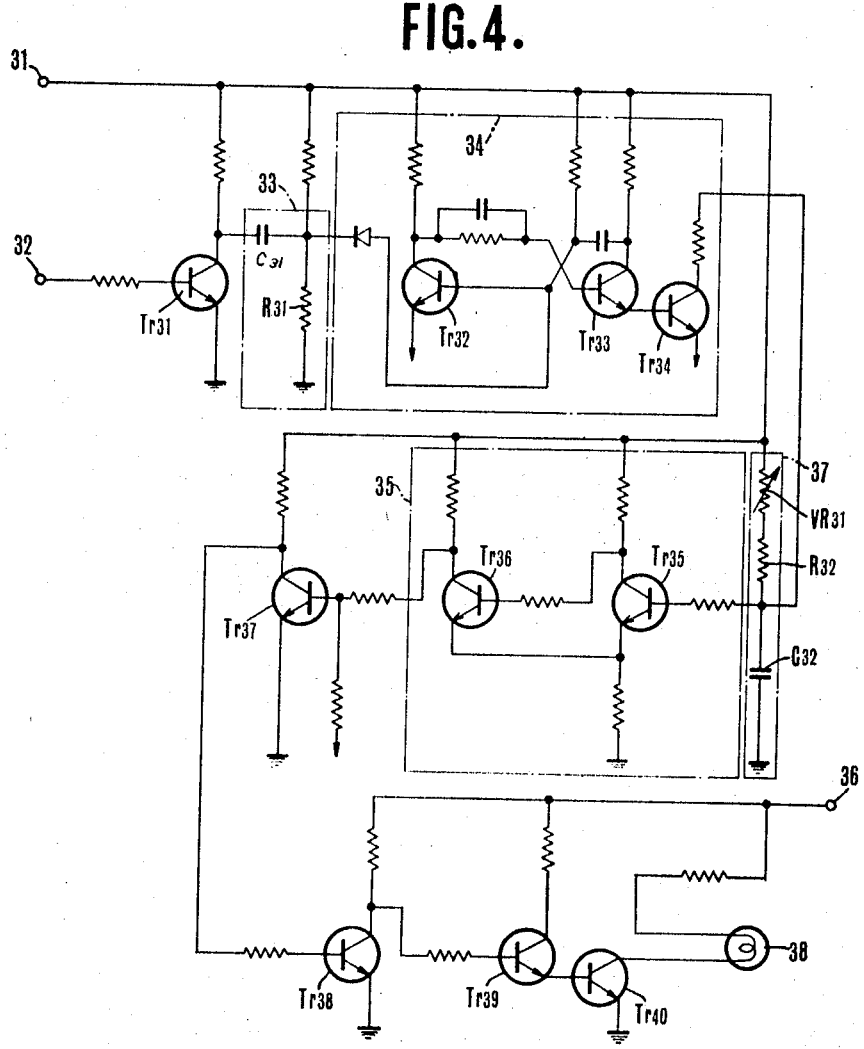
FIG. 4 is a circuit diagram of balance-detector device.

FIG. 4 is a circuit diagram illustrating one embodiment of the balance circuit.

In the figure, 31 is a +12 v. power supply line and 32 is an input terminal. When a pulse signal enters this terminal 32 from the detector 17, base voltage of the transistor $Tr_{31}$ ascends then the transistor $Tr_{31}$ becomes conductive and its collector voltage descends, so that a negative trigger signal is emitted by the differential circuit 33 composed of capacitor $C_{31}$ and resistor $R_{31}$, causing temporarily negative voltage at the base of transistor $Tr_{32}$ in the monostable multivibrator 34, then the transistor $Tr_{32}$ becomes nonconducting.

Because of the above-mentioned, collector voltage of the transistor $Tr_{32}$ ascends, letting the transistors $Tr_{33}$, $Tr_{34}$ be conductive, then the capacitor $C_{32}$ is not charged; base voltage of the transistor $Tr_{35}$ descends; collector voltage of the transistor $Tr_{36}$ in the Schmidt circuit descends, so that the transistor $Tr_{37}$ becomes nonconducting; the transistor $Tr_{38}$ becomes conductive; collector voltage of the transistor $Tr_{38}$ descends, then the transistor $Tr_{39}$, $Tr_{40}$ becomes nonconducting, so that the balance lamp 38 connected by +24 v. power supply does not light and no output signal is generated.

When the pulse stops entering the input terminal 32, the negative trigger signal from the differential circuit 33 is not generated any longer, then the transistor $Tr_{32}$ becomes conductive; the collector voltage of the transistor $Tr_{32}$ descends, then the transistors $Tr_{33}$, $Tr_{34}$ becomes nonconducting. Therefore, after some time elapses, the capacitor $C_{32}$ is charged by the integral circuit 37 composed of variable resistor $VR_{31}$, resistor $R_{32}$ and capacitor $C_{32}$; the base voltage of the transistor $Tr_{35}$ ascends; the collector voltage of the transistor $Tr_{36}$ in the Schmidt circuit 35 ascends; the transistor $Tr_{37}$ becomes conducting; the transistor $Tr_{38}$ becomes nonconducting; the collector voltage of the transistor $Tr_{38}$ ascends, then the transistors $Tr_{39}$, $Tr_{40}$ becomes conductive and the balance lamp 38 lights.

In this connection, the above values of voltages and others are merely one embodiment of this invention; several values of resistors and others are inserted in the circuit and if a relay is inserted in place of the lamp, it is possible to actuate this relay when the weighing machine balances.

From the above-mentioned, it is clear that the balance lamp 38 or the relay or such does not move when pulses successively enter the input terminal 32, but moves only if movement of the weighing mechanism is stabilized and no input pulse exists during the time interval longer than a certain value, so that correct typewriting of the weighed value are possible if the typewriting device are actuated by this signal.

In this invention as above-mentioned, tangent of turned angle $\theta$ of the lever in the pendulum type weighing machine is designed so as to be proportional to the weight to be weighed; a scale of the magnetic signal proportional to the $\tan^{-1}$ is indented in the arcform lattice moving together with the lever and detected by the detector; the weight is measured by counting the pulses from the detector, therefore, complex mechanism such as devices using a rack pinion mechanism is not needed any longer, then errors due to friction and such disappear and the mechanism becomes very simple. In this connection, as the inclined angle of pendulum type balance is generally nonlinear, in the conventional weighing machines, the nonlinear angle is indicated by using a cam correcting the nonlinear line to a linear line, so that the mechanism becomes complex and manufacture and installation of the cam have been difficult; especially high precision has been possible.

Moreover, nonlinearity due to a poise-weight increasing device and tare eliminating device added to the balance can not be corrected by the cam and such. In the weighing device of this invention, however, digital indication becomes possible in any balance device with any nonlinearity if the magnetic lattice is magnetized (and recorded) every instant increasing one unit of weight when the magnetic lattice corresponding to the scale is magnetized (and recorded).

Furthermore, only if a single standard prototype of said magnetic lattice is made, thereafter it is simple to make its copy by the same method as copy of a magnetic tape, and there are great merits never seen before in the conventional devices, for instance, the mass production is easy.

All the more, this invention has several excellent effects such as even a light object can be weighed with high precision because of absence mechanical contact part.

As before-mentioned, as the weight is detected by addition and subtraction of pulses emitted from the detector which detects graduations of magnetic signal in the arcform magnetic lattice turning together with the lever of the weighing machine, a pulse is emitted only when the arcform magnetic lattice moves, consequently the zero point is determined by reset of the counting device when the arcform magnetic lattice rests, so that strict adjustment of the zero point is not necessary and it makes the device very convenient one; especially, when several brands of materials are successively thrown in the hopper or such with the proper mutual proportion, nothing is necessary except reset of the addition and subtraction machine per brand, so that the machine is remarkably simplified as compared with the conventional weighing machine which adjust the zero point by using a complex operating mechanism of motor, heavy weights and others. Almost all of the mechanically movable parts in each circuit can be eliminated by using transistors and each circuit can be set up at a (long) distance from the weighing mechanism of the lever and others, consequently each circuit can be set up at a safe place where there is no effect of dust, etc., and the operation is easy.

What is claimed is:

1. A weighing device comprising a fulcrumed lever which turns from an initial position to a position at an angle $\theta$ to said initial position where the turning force due to the object to be weighed and the opposite turning force due to the weight of the balance device balances, a part of a cylindrical surface on said lever having the axis thereof centering on the fulcrum of said lever, a magnetic lattice provided on said cylindrical surface, a magnetic signal graduation provided on said magnetic lattice being arranged at a pitch of $\tan^{-1}$ of the angle $\theta$ to said initial position at which the lever comes to rest, a detector fixed in position adjacent said cylindrical surface for detecting said graduation as said lever moves and for emitting two different pulse signals according to the moving direction of the graduation by detecting the moving direction of the graduation, and a counting device for addition and subtraction coupled to said detector and which discriminates movement of the lever in the positive or negative direction by the pulse signal from said detector for adding the positive pulses and subtracting the negative pulses.

2. A weighing device as claimed in claim 1, further comprising a setting device coupled to said counting device for setting a constant weight value, a first generating device coupled to said counting device for generating a prequantifying signal which emits a signal when the weight detected by the counting circuit reaches a value before the constant weight pulse set by said setting device, and a second generating device coupled to said counting device for generating a quantifying signal when the weight reaches the constant weight value a balance device coupled to said counter which detects stoppage of movement of said lever for more than a given time interval due to balancing of the lever and emits a balance signal, and a typewriting device coupled to said balance device for operation to type an output only when it receives the balance signal from the balance device.

3. A weighing device as claimed in claim 1, further comprising a setting device coupled to said counting device for setting a constant weight value, a first generating device coupled to said counting device for generating a prequantifying signal which emits a signal when the weight detected by the counting circuit reaches a value before the constant weight value set by said setting device, and a second generating device coupled to said counting device for generating a quantifying signal when the weight reaches the constant weight value.

4. A weighing device as claimed in claim 3, in which said generating devices comprise a plurality of selection switches for setting a desired weight and corresponding to the number of figures in the weight, and a further plurality of selection switches for setting the value before the constant weight and which are coupled with and move simultaneously with said switches for setting the desired weight.

* * * * *